Carl Boyars
Charles F. Sharn
INVENTORS.

United States Patent Office 3,379,178
Patented Apr. 23, 1968

3,379,178
FAST STARTUP DEVICE FOR TORPEDO POWER PLANT
Carl Boyars and Charles F. Sharn, Silver Spring, Md., assignors to the United States of America as represented by the Secretary of the Navy
Filed Nov. 17, 1964, Ser. No. 412,297
10 Claims. (Cl. 122—247)

The invention described herein may be manufactured and used by or for the Government of the United States of America for governmental purposes without the payment of any royalties thereon or therefor.

The present invention relates to torpedo power plants and more particularly to a starting charge for a lithium fueled boiler of a torpedo power plant.

Conventional torpedo power plants have not been found to function completely satisfactorily under widely varying conditions, and particularly at great depths. The use of lithium as a solid fuel in the boiler of a torpedo power plant provides a wakeless torpedo which operates with no loss of efficiency at great depths and runs at high speeds to double the range of conventional torpedoes. In order to best react the lithium with the oxidant gas, e.g. sulfur hexafluoride in the boiler, it is desirable to heat the lithium to a temperature which is above the melting point of lithium and above the temperature at which the oxidant decomposes. The previous method of melting the solid lithium fuel was to initiate a localized reaction of a small quantity of lithium and oxidant and then to utilize the heat produced by this reaction to melt the main lithium charge so that it will react with the main supply of oxidant gas when the oxidant is introduced into the lithium. The previous method of generating the initial heat to change the main lithium charge from a solid to a liquid is relatively slow and, because of the substantial amount of time required to bring the lithium charge to its operating temperature, the overall operational feasibility of the entire boiler system has been seriously impaired.

The present invention provides a lithium charge for the boiler of a torpedo power plant in combination with a starter which is capable of elevating the temperature of the lithium to its operating temperature within a very brief interval of time. In one embodiment, the boiler is filled with a mixture of lithium shot and pyrotechnic pellets, the pellets being utilized to rapidly heat the lithium to its melting point. In another form of the invention, the fast startup of the boiler charge is achieved by drilling cylindrical longitudinal bores in a block of lithium and inserting the pyrotechnic pellets into the bores, the bores being divided into compartments by means of screens to restrict the movement of the pellets in the bore and thereby prevent physical damage to the pellets. A third embodiment of the invention provides a fast startup device for the torpedo power plant by forming a plurality of longitudinal bores within the block of lithium, said bores having a star-shaped cross-section, and filling the bores with pyrotechnic pellets. In each of the embodiments, the startup pressure of the system is maintained at a minimum by controlling the relationship of the shape and size of the pyrotechnic pellets with respect to the bores in which the pellets are placed, and by proper orientation of the bore configuration within the main lithium charge.

An object of the present invention is the provision of a fast startup device for a torpedo power plant wherein the mass of solid lithium fuel is brought to its operating temperature in a very brief interval of time.

Another object of the invention is to provide a fast startup device for a torpedo power plant wherein the mass of lithium is brought to its operating temperature almost instantaneously without over-pressurizing the boiler structure of the torpedo, wherein the starting charge utilized to heat the lithium does not affect the chemical and physical integrity of the boiler system.

Other objects, advantages and novel features of the invention will become apparent from the following detailed description when considered in conjunction with the accompanying drawings wherein.

Figure 1:
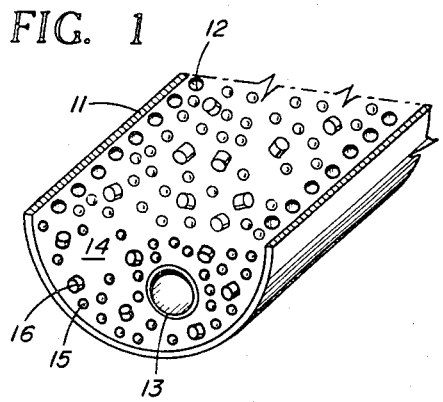
FIG. 1 is an isometric view, partially in section, of one embodiment of the present invention.

In the embodiment illustrated in FIG. 1, there is shown a metallic boiler casing 11 having a helical tubular coil 12 concentrically disposed within the boiler casing and positioned in close proximity to the inner peripheral wall of the casing. Fixedly mounted within the boiler casing and extending longitudinally throughout the length thereof is a hollow metallic gas core tube 13 having a plurality of transverse through apertures formed therein for introducing an oxidant gas into the fuel 14 which surrounds the gas core tube 13 and completely fills the boiler casing 11. The main fuel charge 14 consists of solid lithium in the form of small spheres or shot 15 and is uniformly mixed with a pyrotechnic starting charge in the form of small cylindrical pellets 16. The pyrotechnic pellets consist of a mixture of aluminum powder and copper oxide. The size and shape of the pyrotechnic pellets and lithium shot must be such as to permit uniform mixing of the pellets in the shot and to provide a void volume of the mixture of not greater than 30% of the total volume. Tests have indicated that the mixture functions very well if the diameter of the lithium shot is maintained between .09 to .13 inch and the size of the cylindrical pyrotechnic pellets is such that the diameter of the cylinder is approximately ¼ inch and the length is approximately ⅛ inch. In operation, the lithium shot and pyrotechnic pellet mixture is ignited at one spot at one end of the boiler by an electro-responsive pyrotechnic initiator, e.g. squib, not shown, and the burning spreads rapidly to the rest of the charge to melt the lithium and thereby prepare it for reaction with the oxidant gas introduced through the gas core tube 13.

Figure 2:
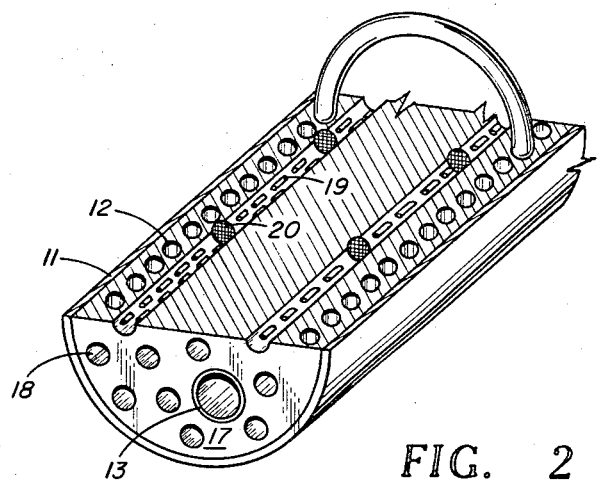
FIG. 2 is an isometric view, partially in section, of another embodiment of the invention.

Referring to FIG. 2 of the drawings, there is shown a second embodiment of the invention wherein a solid block of lithium is utilized as the fuel or boiler charge. The boiler casing 11 is shown with its end closure and the electroresponsive pyrotechnic initiator removed to expose the end of the cylindrical block 17 of lithium. The boiler casing 11 has the helical tubular coils 12 and gas core tube 13 disposed therein and a solid block of lithium 17 is cast within the boiler around the coils 12 and gas core tube 13. A plurality of cylindrical bores 18 are drilled into the lithium block and extend longitudinally along the block parallel to the axis thereof. Each cylindrical bore 18 is divided into a plurality of compartments by means of screens 20 and each compartment is partially filled with pyrotechnic pellets 19. The pellets may be made of any gasless pyrotechnic material, i.e. a material which upon burning produces no permanent gases, e.g. a mixture of aluminum powder and potassium perchlorate, being commercially available as "Alclo." In the loading of the pyrotechnic pellets 19 within the cylindrical bores 18, sufficient pellets are introduced into one of the bores to partially fill a compartment and then a screen 20 in the form of a resilient disc is forced down the bore hole to a predetermined depth, the edges of the screen disc gripping the inner peripheral walls of the cylindrical bores 18, sufficient pellets are introduced into one of the partment. Additional pellets and screens are sequentially inserted into the bore to provide a predetermined number of compartments each of which is partially filled to a predetermined percent of its capacity. In certain circumstances when it is not desirable to completely fill the bore hole 18 with the pyrotechnic pellets 19, the screens 20 may be utilized to accurately control the void volume of the bore holes 18. If a long cylindrical bore 19 is only partially filled with pyrotechnic pellets 19, the pellets are permitted to freely move back and forth within the long bore 18 and are consequently subjected to inertial impacts of a magnitude sufficient to cause the pellets to break. By compartmenting the cylindrical bores 19 by means of the screens 20, it is possible to partially fill the bores with pyrotechnic pellets and sufficiently restrict the movement of the pellets within the bore to prevent physical damage to the pellets. If the screens were not employed to compartmentize the bores and the pellets were permitted to break apart and be changed into a powder, the surface area of the pyrotechnic material would be substantially increased and ignition of the powder would create extreme over-pressures which would adversely affect the operation of the boiler and perhaps completely destroy the boiler. In operation, the pellets 19 within the bores 18 are ignited by an electroresponsive pyrotechnic initiator, not shown, and the burning spreads rapidly throughout the bores to almost instantaneously generate sufficient heat to nearly reach the boiler's operating temperature to permit the fuel to react with the oxidant gas introduced through the gas core tube 13.

Figure 4:
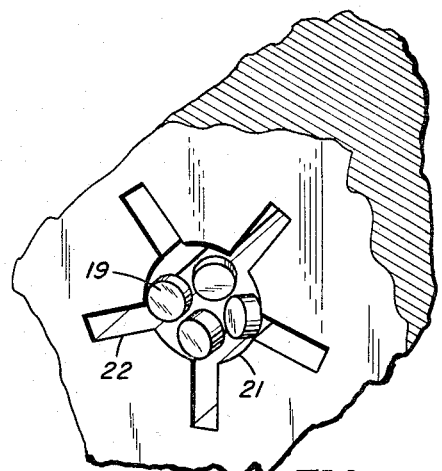
FIG. 4 is an exploded sectional view of a portion of the invention illustrated in FIG. 3, taken on lines 4—4 of FIG. 3.
Figure 3:
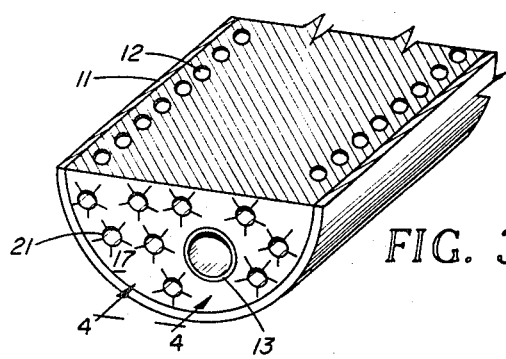
FIG. 3 is an isometric view, partially in section, of a third embodiment of the invention.

In FIG. 3 there is shown a boiler casing 11 having its end closure plate and electroresponsive pyrotechnic initiator removed to expose the lithium charge therein. The boiler 11 is completely filled with a solid block of lithium fuel 17 which surrounds the gas core tube 13 and the helical tubular coils 12. A plurality of longitudinally extending bores 21 are formed in the lithium block, said bores being parallel to the axis of the block. Each bore 21 is provided with a plurality of radially extended slots 22 to give the bore a star-shaped cross-section, as seen more clearly in the exploded view of FIGURE 4. The center of each of the bores 21 is completely filled with pyrotechnic pellets 19 and therefore the movement of the pellets within the bores is restricted, thus eliminating the danger of breakage of the pellets. The radially extending slots 22 provide the bores 21 with ample void volume to protect against the build up of over-pressures in the pellet packed bores. The slots 22 further provide additional area to the bores and therefore facilitate rapid heat transfer from the pellets to the lithium, thereby reducing the amount of time required to bring the boiler to its operating temperature. The pellets with the star-shaped bores are ignited by an electroresponsive pyrotechnic initiator, not shown.

It has also been found that the star-shaped bores in the lithium block may be provided with a solid "Alclo" cylindrical rod in lieu of being filled with pellets 19, the slots 22 providing sufficient void volume to prevent the development of dangerous over-pressures and further providing excellent heat transfer to the lithium block. It is also feasible to utilize solid cylindrical gasless pyrotechnic rods within the cylindrical bores 18 of FIGURE 2 to melt the lithium block, provided the diameter of the rods is so related to the diameter of bores 18 to provide proper void volume for controlled burning of the pyrotechnic rods without producing any accompanying over-pressures.

From the foregoing, it is apparent that the present invention provides various combinations of boiler charges and pyrotechnic charges whereby a solid lithium fuel may be almost instantaneously heated to approximately 1300° F. so that the lithium may be reacted with an oxidant gas introduced into the interior of the charge. Since solid lithium will not react with the oxidant gas, it is necessary to provide means for elevating the temperature of the boiler to well above the melting point of lithium to facilitate the desired exothermic reaction. The successful operation of the torpedo power plant is dependent upon generating steam within the cylindrical tubular coils 12 in the boiler as soon as possible, which first requires that the lithium charge be heated to well above its melting temperature so that it may be reacted with the oxidant. The present invention provides various alternatives for raising the temperature of lithium to its operating point almost instantaneously without adversely over-pressurizing the boiler or requiring the extensive alterations to the design of the boiler and without producing any byproducts which adversely affect the chemical and physical integrity of the boiler system.

Obviously many modifications and variations of the present invention are possible in view of the above teachings. It is therefore to be understood that within the scope of the appended claims the invention may be practiced otherwise than as specifically described.

What is claimed is:
1. In a torpedo power plant,
    a casing defining a combustion chamber,
    a pipe mounted longitudinally within the casing for introducing an oxidant into the chamber,
    a plurality of tubular coils mounted within said combustion chamber for generating steam.
    a mixture of lithium shot and pyrotechnic pellets surrounding said pipe and coils and filling said chamber,
    and means for igniting the mixture of lithium shot and pyrotechnic pellets,
    whereby the ignited pellets rapidly raise the temperature of the lithium shot above its melting point to enable the lithium to react with the oxidant and further heat the coils to generate steam for the power plant.
2. The device of claim 1 wherein said pyrotechnic pellets consist of copper oxide and aluminum powder.
3. The device of claim 2 wherein the means for igniting the mixture of lithium shot and pyrotechnic pellets comprises an electroresponsive pyrotechnic initiator.
4. In a torpedo power plant,
    a casing defining a combustion chamber,
    a plurality of tubular coils mounted within said chamber for generating steam,
    a mass of lithium surrounding said coils and filling said chamber,
    a pipe fitted into an oxidant receiving bore formed longitudinally in said lithium mass for introducing an oxidant into the lithium for exothermal reaction therewith,
    said lithium mass having a plurality of pyrotechnic receiving bores formed longitudinally therein and having gasless pyrotechnic material disposed in said bores, and
    ignition means contacting one end of said lithium mass and aligned with said pyrotechnic receiving bores for igniting the pyrotecnic material,
    whereby the ignited pyrotechnic material rapidly raises the temperature of the lithium substantially above its melting point to enable the lithium to react with the oxidant and generate steam within the coils.
5. The device of claim 4 wherein said ignition means comprises an electroresponsive pyrotechnic initiator.
6. The device of claim 5 wherein said pyrotechnic material comprises a plurality of pellets consisting of aluminum powder and potassium perchlorate.
7. The device of claim 6 further comprising
    at least one porous partition fixedly secured within each pyrotechnic receiving bore to divide each bore into compartments and protect the pellets from physical damage.

8. The device of claim 5 wherein said pyrotechnic material consists of aluminum powder and potassium perchlorate in the shape of a rod having a diameter less than the diameter of pyrotechnic receiving bores.

9. The device of claim 6 wherein said lithium mass has formed therein a plurality of longitudinal slots contiguous with and extending radially outwardly of each of said pyrotechnic receiving bores, whereby the bores may be completely filled with pellets to prevent damage thereto while the slots provide ample void volume to assure rapid burning of the pellets and good heat transfer to the lithium mass.

10. The device of claim 4 wherein said pyrotechnic receiving bores are completely filled with gasless pyrotechnic pellets, said one end of the lithium mass being spaced from said casing to define a void volume adjacent said one end.

No references cited.

CARLTON R. CROYLE, *Primary Examiner.*